United States Patent [19]

Frick

[11] Patent Number: 4,603,371
[45] Date of Patent: Jul. 29, 1986

[54] CAPACITIVE SENSING CELL MADE OF BRITTLE MATERIAL

[75] Inventor: Roger L. Frick, Chanhassen, Minn.

[73] Assignee: Rosemount Inc., Eden Prairie, Minn.

[21] Appl. No.: 660,396

[22] Filed: Oct. 12, 1984

[51] Int. Cl.$^4$ .......................... H01G 7/00; G01L 9/12
[52] U.S. Cl. ........................................ 361/283; 73/724
[58] Field of Search ............... 340/870.37; 73/706, 73/708, 718, 724; 361/283; 29/25.41

[56] References Cited

U.S. PATENT DOCUMENTS

| | | | |
|---|---|---|---|
| 4,058,788 | 11/1977 | Andrews et al. | 338/42 |
| 4,084,438 | 4/1978 | Lee et al. | 73/706 |
| 4,163,395 | 8/1979 | Medlar et al. | 73/708 |
| 4,168,518 | 9/1979 | Lee | 361/283 |
| 4,169,389 | 10/1979 | Yasuhara et al. | 73/718 |
| 4,177,496 | 12/1979 | Bell et al. | 361/283 |
| 4,207,604 | 6/1980 | Bell | 361/283 |
| 4,244,228 | 1/1981 | Lehnhardt | 73/716 |
| 4,301,492 | 11/1981 | Paquin et al. | 361/283 |
| 4,332,000 | 5/1982 | Petersen | 361/283 |
| 4,388,833 | 6/1983 | Kuwayama | 73/724 X |
| 4,390,925 | 6/1983 | Freud | 361/283 |
| 4,398,194 | 8/1983 | Johnston | 340/870.37 |

FOREIGN PATENT DOCUMENTS 0111348 10/1983 European Pat. Off. .

OTHER PUBLICATIONS

Behr, M. and J. Giachino, A Miniature Pressure Sensor for Automotive Applications, I Mech E. Conference Publications 1981-10 (1981), presented at The Third International Conference on Automotive Electronics at London in Oct. 1981.

Primary Examiner—Donald A. Griffin
Attorney, Agent, or Firm—Kinney & Lange

[57] ABSTRACT

A pressure sensing cell construction comprises a pair of plates which are joined together around the periphery, to form a first chamber. A second chamber, preferably identically constructed to the first chamber is connected to the first chamber through a conduit. The chambers and the conduit are filled with noncompressible liquid, so that when pressure acts on the outer surfaces of the plates, at least one plate deflects and the liquid in one chamber will tend to be squeezed out into the other chamber, and by measuring the spacing between the plates the pressure sensed can be determined. The plates preferably are made of a brittle material so that pressures can be determined with high accuracy. The plates forming the chamber subjected to the higher pressure will contact each other as a positive stop to limit the amount of deflection of the plates forming the other chamber as the fluid causes such other chamber to expand under high overpressures on the plates of the chamber subjected to higher pressure. Thus, the device will withstand this high overpressure without damage, even though it is constructed of brittle materials.

25 Claims, 9 Drawing Figures

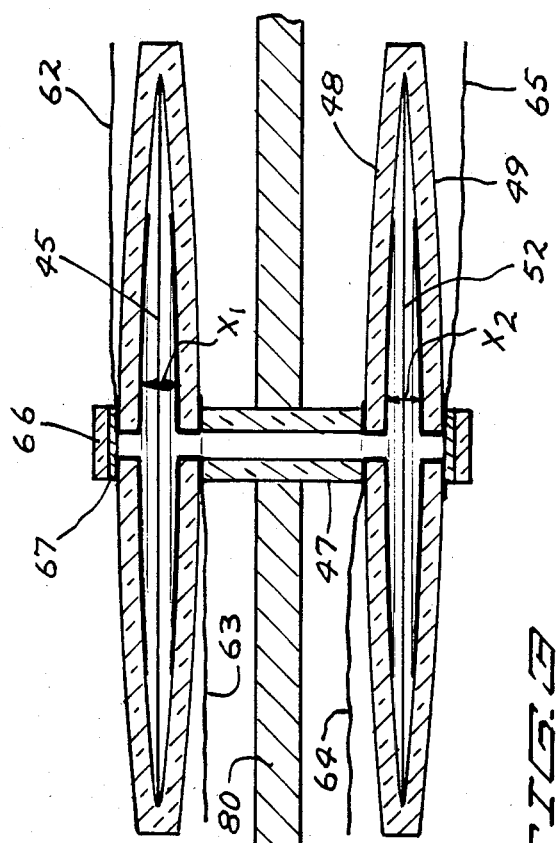
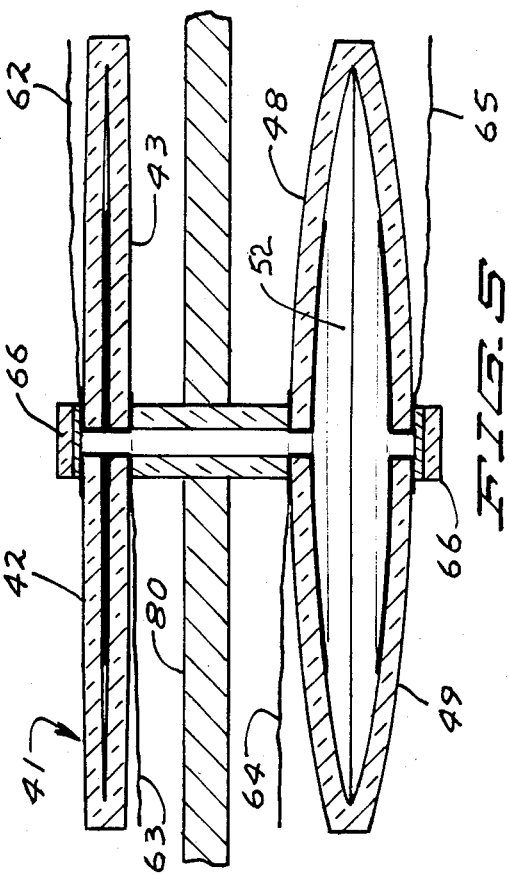
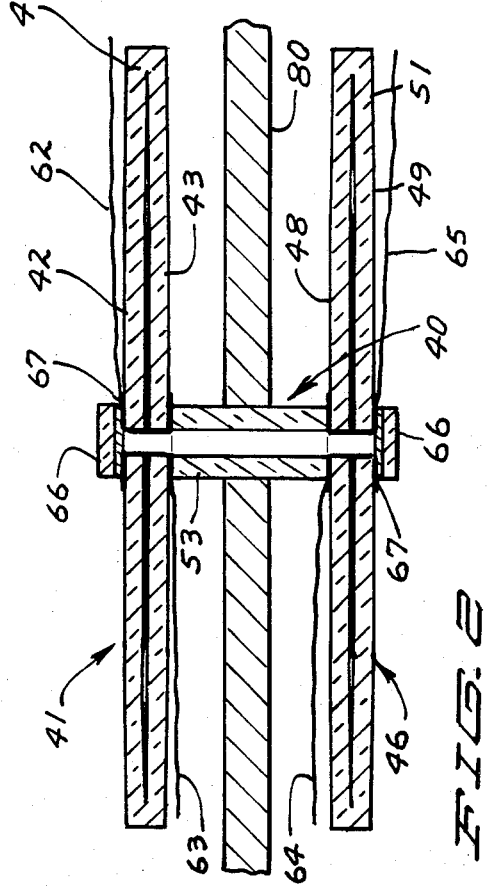
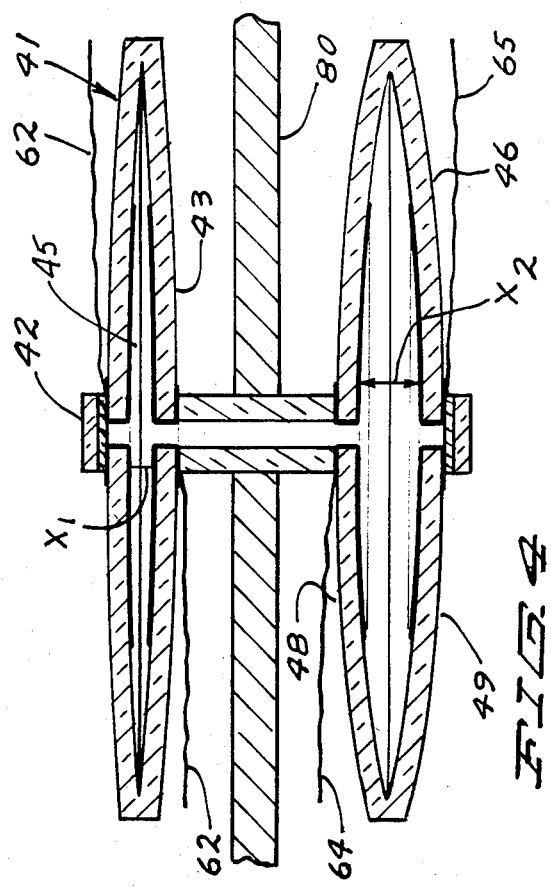

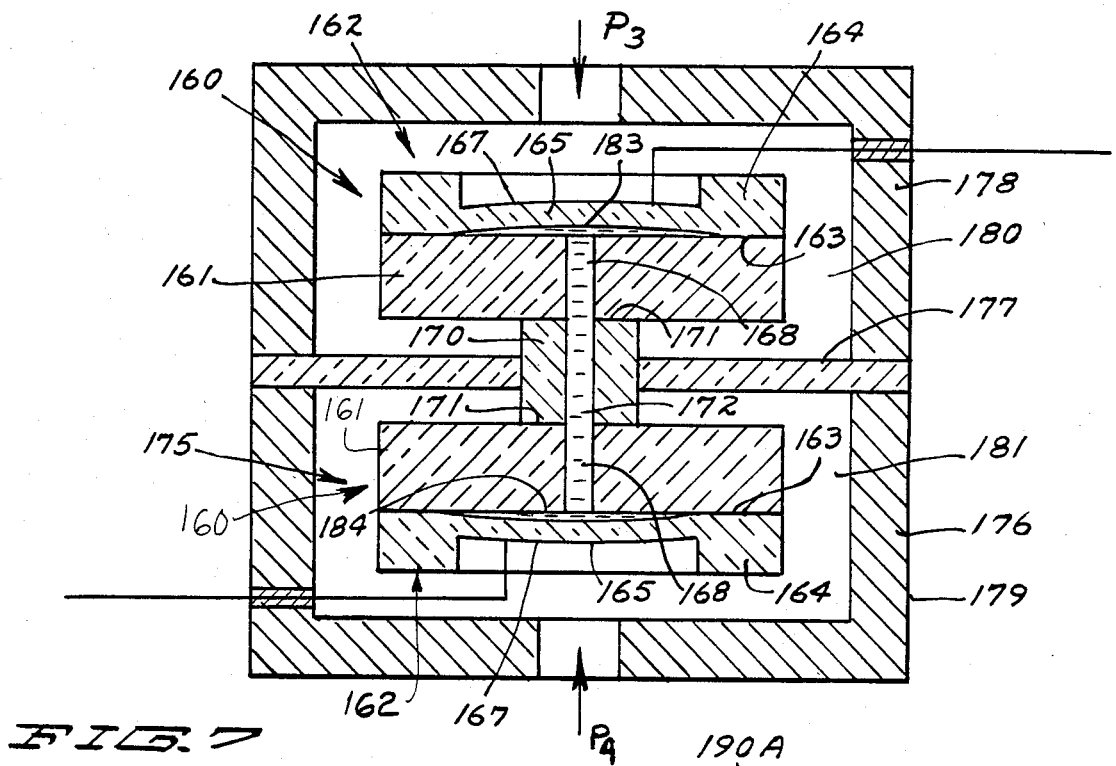
FIG. 7
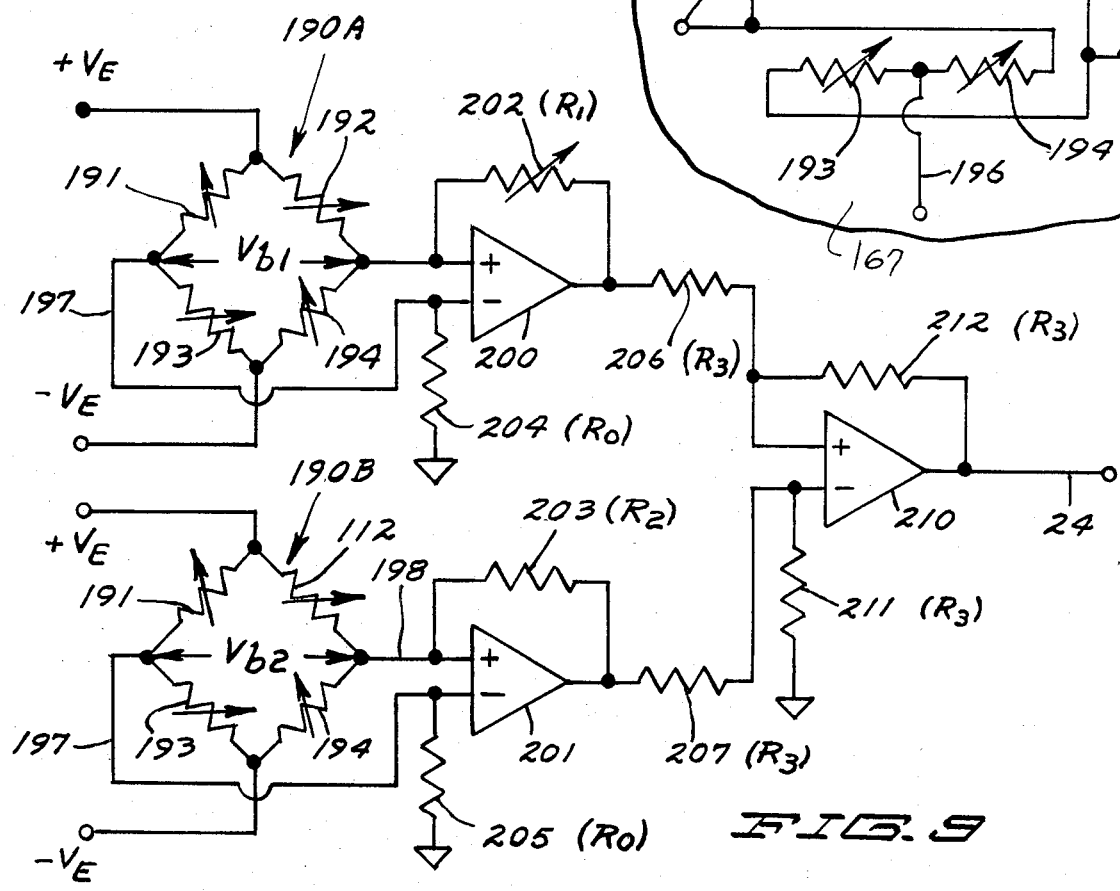
FIG. 8
FIG. 9

CAPACITIVE SENSING CELL MADE OF BRITTLE MATERIAL

BACKGROUND OF THE INVENTION

1. Field of the Invention

The present invention relates to a capacitive type pressure sensing cell having deflecting plates or diaphragms useful for measuring fluid pressures acting on the plates and using brittle materials for the deflecting plates.

2. Description of the Prior Art

Various pressure sensing devices have been advanced in the art which utilize deflecting diaphragms, the movement of which is detected by capacitive sensing, and which include overpressure protection. Further, various pressure sensors, particularly differential pressure sensors, have utilized a fluid fill between the diaphragms which are deflecting.

Pressure sensing cells, which have sensing diaphragms on opposite sides of a center block, so that each of the diaphragms forms a separate chamber, with the chambers fluidly connected and wherein differentials in pressure on the respective diaphragms will cause deflection of such diaphragms are shown in U.S. Pat. No. 4,398,194, and also in U.S. Pat. No. 4,169,389. Each of these patents teach that differences in temperature will cause different volumes of oil filling the space enclosed by the diaphragms. In U.S. Pat. No. 4,398,194 this difference in volume is compensated by the sensing circuitry, while in U.S. Pat. No. 4,169,389 the differences in volume are compensated for mechanically. In each of these patents a center, non-deflecting mounting block is utilized, as distinguished from the present device where chambers are formed from two plates, both of which will be deflected by external pressure variations.

European patent publication No. 0111348 also shows a capacitance sensor having a central block with deflecting diaphragm on opposite sides of the block and a fluid filling under the deflector diaphragm.

U.S. Pat. No. 4,177,496 discloses a capacitive pressure sensor comprising two discs made from a brittle insulator material, such as alumina, fused silica or glass, and which have spaced surfaces, facing each other, with conductive layers on such surfaces. A single chamber is formed, and when the discs are subjected to external pressures the discs tend to move toward each other. The deflection of the discs is measured capacitively to provide an indication of the pressure acting on the discs. Portions of the discs are made to come into contact under overpressure to attempt to prevent damage to the sensor itself from excessive overpressures. A device similar to the one shown in U.S. Pat. No. 4,177,496 is also shown in U.S. Pat. No. 4,207,604.

U.S. Pat. No. 4,058,788 shows diaphragm assemblies each comprising a pair of flexible corrugated diaphragms sealed at their peripheries to form fluid filled chambers. The pressure being sensed acts on the outer surfaces of both of the diaphragms forming the respective chambers. Differential pressures acting on the diaphragms forming two fluidly connected chambers cause a movement which is sensed by a cantilever beam having strain gages for sensing the motion. The diaphragms are flexible, and metallic, and are not made of a brittle material.

A capacitor sensor shown in U.S. Pat. No. 4,168,518 is made of a material such as quartz and comprises two members that are joined together to form an interior chamber and which have portions that deflect toward each other in response to pressure acting on the exterior surfaces of the deflecting members.

U.S. Pat. No. 4,084,438 also shows a pressure sensing device which has spaced apart walls that are sealed at their peripheries to form an interior chamber, and capacitive sensing means on the inner surfaces of the walls, so that as the walls deflect under pressure and the spacing changes, an electrical signal is provided. The device shown in U.S. Pat. No. 4,084,438 further teaches the use of a material such as quartz for forming the sensor.

U.S. Pat. No. 4,332,000 is of interest in that it shows capacitive pressure sensors formed from semiconductor material and discloses forming the sensor and the sensing circuity in the same process.

U.S. Pat. No. 4,390,925 also deals with a multiple cavity, pressure sensor formed on a silicon wafer.

U.S. Pat. No. 4,244,228 shows a pressure sensor which comprises slightly cupped shaped disc members that are joined at their peripheral edges and which will deflect under pressure. Under excessive pressures the plates will rest against each other. The discs are formed in a cup shape and made of a spring material in order to operate.

U.S. Pat. No. 4,301,492 shows a pressure sensor which utilizes diaphragms that are formed in a stacked arrangement, filled with fluid, and which will deflect under pressure. This is sensed by capacitive sensors, and is compensated for errors due to temperature shifts. The chambers are formed by having the deflecting diaphragms spaced from each other by annular rims in a rest position. The sensor can be used for measuring differential pressures, but does require, in the form disclosed, recesses formed in the diaphragm discs to provide the necessary spacing.

U.S. Pat. No. 4,163,395 shows a sensor for sensing differential pressures that has flat diaphragms, the space between which is oil filled to set the diaphragm spacing. The diaphragms will "bottom out" under overload. An external sensor is used, apart from the deflecting diaphragm assembly, and the oil from the space between the diaphragms acts on the external sensor as pressure changes.

The prior art thus does teach use of brittle materials for forming deflecting members in pressure sensors. Brittle materials are desirable because of low hysteresis and repeatability. Overpressure protection is also necessary, and the sensor construction of the present invention provides simple and effective overpressure protection in both directions, while also providing a sensor which is low cost and accurate and may be made in a batch process.

SUMMARY OF THE INVENTION

The present invention relates to a pressure sensing cell construction comprising pressure responsive diaphragm members made of a brittle material such as quartz, silicon or the like, that are formed into diaphragm assemblies. The diaphragm assemblies comprise two plates of the selected brittle materials (one of which may be rigid), sealed or joined together at their outer edges to form an interior chamber which is filled with an oil to set the initial spacing between the facing surfaces of the plates. The interior chamber of each diaphragm assembly is in turn connected to means, such as a second chamber which has walls, capable of resisting transfer of fluid from the first chamber at a known relation to pressure, and preferably comprising a diaphragm assembly identical to the first assembly to form the second chamber. As shown, a pedestal that has an internal passageway for transferring fluid between the first and second chambers supports both diaphgram assemblies. Separate pressures are applied to the outer surfaces of the plates of both of the diaphragm assemblies, and any differentials in pressure will cause at least one plate of each assembly to deflect and fluid will move from one chamber to the other, and a resultant change of the spacing of the facing surfaces of the plates of the respective diaphragm assemblies, which can be measured with suitable sensing means.

Capacitive sensing means may be used and comprises conductive thin film layers deposited on the surfaces of the plates that face each other and which layers are connected to capacitive sensing circuitry. Strain gage or motion sensing may also be used.

The plates of each diaphragm assembly are joined together at their edges to form a chamber when the plates are at rest (unstressed), and substantially flat. The chamber is filled with a noncompressible fluid, such as a suitable oil, to bow at least one of the plates and provide an initial spacing. The plates will deflect under pressure, and as disclosed the plates of the chamber being subjected to the greatest pressure will, in the normal range of operation, not touch each other. Under high overpressures the facing surfaces of the plates will contact and support each other. When the plates contact, substantially no tensile stress is exerted on the plates. This permits very high overpressure protection because the brittle materials can carry compression very well, but are not capable of carrying high tension loads. When the plates are in contact, under substantially zero tension stress, the external applied pressures have little effect.

The volume of the filling of oil is selected so that the second chamber plates are not overstressed when the first chamber plates are in contact. It is also selected to be substantially larger than the volume of the passageway connecting the two chambers to minimize errors due to expansion of the fill fluid with temperature.

The overpressure protection is positive and does not require external components. The sensors have the advantage of using brittle materials without overstress problems from overpressure. The sensors are easily made and the conductive coating on the facing surfaces of the diaphragm assemblies may be applied in a batch process for low cost, but accurate application.

BRIEF DESCRIPTION OF THE DRAWINGS

FIG. 2 is a part schematic sectional view of the pressure sensor shown in FIG. 1 in an initial condition after assembly;

FIG. 3 is a part schematic sectional view of the sensor assembly of FIG. 2 showing the chambers formed after an initial filling of noncompressible fluid, such as oil;

FIG. 4 is a part schematic sectional view of the sensor assemsbly of FIG. 3 showing a typical full scale deflection position of the sensor under differential pressures;

FIG. 5 is a part schematic sectional view of the sensor assembly of FIG. 3 showing an overpressure condition under differential pressures;

FIG. 7 is a sectional view of a differential pressure sensor having sensing cells made according to a preferred embodiment of the present invention;

FIG. 8 is a fragmentary schematic representation of a resistance bridge formed on a diaphragm of the pressure sensing cell of FIG. 7; and FIG. 9 is a schematic representation of a strain gage bridge circuit used with the sensor cells of FIG. 7.

DETAILED DESCRIPTION OF THE PREFERRED EMBODIMENTS

Figure 1:
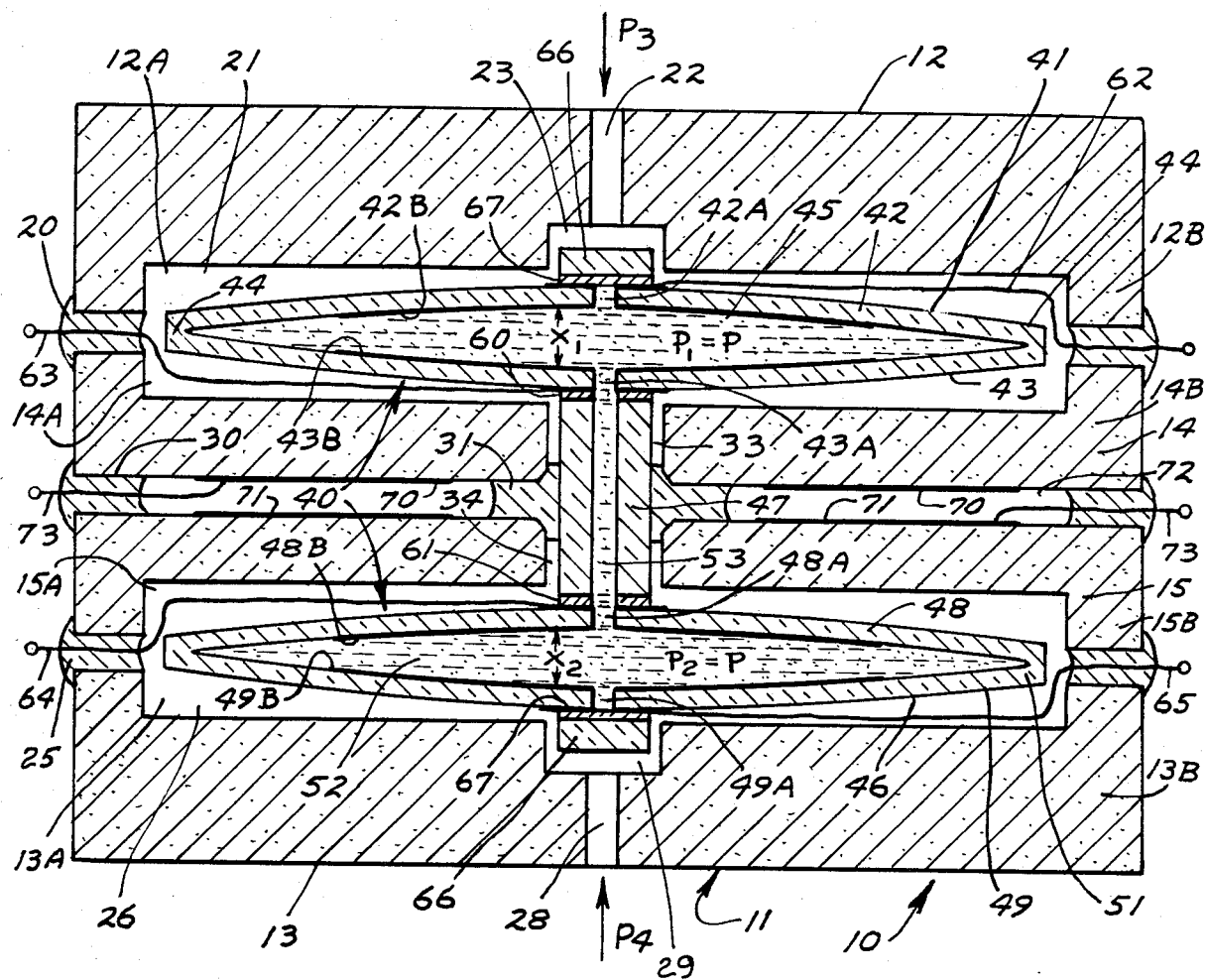
FIG. 1 is a cross sectional view showing a pressure sensor assembly shown in an outer housing and made according to the present invention.

In FIG. 1, a pressure sensor assembly indicated generally at 10 includes an outer housing 11, which has a first end section 12, a second end section 13, and center sections 14 and 15, respectively. Each of the housing sections 12, 13, 14 and 15 have recesses 12A, 13A, 14A, and 15A, respectively defined therein by annular rims 12B, 13B, 14B and 15B. As shown the recesses are generally circular in plan view and the recess 12A faces the recess 14A and together form a first interior pressure chamber 21. Annular rims 12B and 14B face each other and are fused together with a suitable glass layer indicated generally at 20. The glass layer 20 is an annular layer that spaces the adjacent rims and holds them hermetically sealed and fixed in position to form the first interior pressure chamber 21. The housing section 12 has a passageway indicated at 22 leading into the chamber 21, and a recess 23 is provided at the inner end of passageway 22 for accommodating portions of a sensor element.

The rims 13B and 15B are facing each other and adjacent, so that the recesses 13A and 15A are open to each other to form a second interior chamber 26. An annular glass layer 25 is fused to the facing surfaces of the rims 13B and 15B to form the chamber 26. A passageway 28 is defined through the housing section 13, and the housing section 13 also has a recess 29 at the inner end of passageway 28 for accommodating portions of a sensor element in chamber 26.

The sub-assemblies of the housing sections 12 and 14, and 13 and 15, respectively, are held together to form the housing at a center portion by an annular layer of glass indicated at 30 fused to the facing surfaces of the housing sections 14 and 15, and also a layer of glass 31 is fused to the facing surfaces of housing sections 14 and 15 adjacent to provided central passageways 33 and 34, which are defined in the center portions of the housing sections 14 and 15, respectively.

As will be explained, these passageways 33 and 34 are fluidly isolated from each other by glass layer 31.

A sensor element indicated generally at 40 is mounted in the housing 10, and the sensor element includes a first sensor element portion 41 that is mounted in the chamber 21. A second sensor element portion 46 is mounted in the chamberf 26. A connecting conduit indicated at 47, forming a support pedestal is used for supporting and joining the first and second sensor element portions 41 and 46. The sensor element therefore comprises the assembly of the two sensor element portions and the pedestal that joins them.

In detail, each of the sensor element portions comprises a pair of deflecting plates of substantially uniform thickness, as shown, and of suitable size. The plates 42 and 43 form the sensor portion 41. Plates 42 and 43 are fused together or in other suitable ways mechanically joined and sealed at their outer edges at a rim portion indicated at 44. The junction and seal at the rim portion defines a closed interior chamber 45 between the plates 42 and 43.

The sensor element portion 46 comprises a pair of flat plates 48 and 49, respectively, which are preferably constructed identically to the plates 42 and 43. The plates 48 and 49 are mechanically, sealingly joined together at their outer peripheral edges shown at 51 in a suitable manner to define a second sealed chamber 52 between the plates 48 and 49.

In the form of the sensor shown, the sensor element portion plates 42 and 43, and 48 and 49 are made of a suitable brittle material such as a ceramic material, silicon, glass, saphire, or quartz. The brittle material has low tension carrying capability and generally fractures before it yields under tension loading. A material with maximum tensile stress of 1,000 psi to 50,000 psi at failure is considered brittle when it has no well defined yield points. However, such materials have excellent compression carrying capabilities and the compression strength is much greater than tensile strength. The plates are formed to be of substantially uniform thickness across their entire diameter. The pedestal or conduit 47 is formed of a similar material and has an interior passageway 53 so that the conduit 47 is a tubular conduit of brittle (rigid) material.

Each of the plates 42, 43, 48 and 49 has a center hole therein when initially formed, at the central axis of the plate, that is an axis in the center and perpendicular to the general plane of the plate at rest. Such openings or holes are shown at 42A, 43A, 48A and 49A, respectively.

In making the sensor element at a suitable time in the process, the pedestal or conduit 47 is connected to the plates 43 and 48 through the use of a fused glass layer indicated at 60 where the pedestal or end joins plate 43 and at 61 where the conduit end joins plate 48. This layer of glass 60 and 61 is annular so that it leaves a center opening, open to the passageway 53. The passageway 53 is open through the respective openings 43A and 48A into the interior chambers 45 and 52.

The pedestal conduit 47 forms a support for the sensor element so that the plates 42, 43, 48 and 49 are held on the conduit 47 in a rigid assembly, yet the sensing elements are substantially isolated from stresses and strains in the housing 11. When the conduit 47 and sensor element portions 41 and 46 are placed into the housing 11, the layer of glass 31 in passageways 33 and 34 is fused to the outer surface of the conduit 47, all the way around its periphery as well as to the housing sections 14 and 15. Thus, the passageway 33 is sealed from the passageway 34 in the respective housing sections 14 and 15 to fluidly isolate the two passageways. This also then fluidly isolates the housing chamber 21 from chamber 26.

Prior to assembly into the sensor element portions each of the plates 42, 43, 48 and 49 is provided with a layer of electrically conductive materials shown at 42B, 43B, 48B and 49B respectively. The layers may be a thin film deposited on the brittle material plates. The layers form capacitor plates or electrodes and are essentially insulated from each other. Suitable electrical conductors are electrically attached to these layers and used for leads. Each of the electrically conductive layers is formed to extend around the edges forming the respective openings 42A, 43A, 48A and 49A and also extend as a layer a short distance around the respective opening on the outside of the plates after the chambers are formed. The outside layer of conductive material forms a place for conductors or leads to be connected to the capacitor electrodes.

A conductor or lead 62 leading from the layer 42B is connected to the layer 42B adjacent to the opening 42A. The opening 42A is closed with a suitable cap indicated at 66, held in place with a suitable glass layer 67 which holds the conductor 62 in position as well. A conductor or lead 63 from layer 43B is connected to the layer 43B adjacent opening 43A, which is surrounded by glass layer 60, which in turn also holds the lead 63 in position. A conductor or lead 64 is connected to layer 48B adjacent opening 48A and held in place with glass layer 61, and a lead 65 is connected to layer 49B adjacent the opening 49A below a cap 66 and embedded in a glass layer 67 which holds the cap 66 in place and seals opening 49A. The chambers 45 and 52 are thus hermetically sealed, but are open to each other through the interior passageway 53 of the rigid conduit or pedestal 47.

As will be also explained, the facing surfaces of the housing sections 14 and 15 may have layers of conductive material indicated generally at 70 and 71, respectively thereon, and these layers may form electrodes for a reference capacitor. The surfaces of the chamber indicated at 72 formed between the housing sections 14 and 15 may be spaced to provide a reference capacitance. The chamber 72 will hold a reference pressure that can be measured by the plates 70 and 71 operating through suitable leads 73. Additionally, one or both of the surfaces forming the chamber 72 can be used for location of a temperature sensor to determine temperature for compensation purposes or for other purposes.

The chambers 45 and 52 as well as the connecting passageway are filled with oil (noncompressible fluid) after assembly in a suitable manner to space the plates apart at an initial distance, as will be more fully explained. The oil can be injected into a small hole in one of the caps 66, after which the hole can be sealed closed in a suitable manner, such as with a ball that fits partially into the hole and is bonded in place.

Figure 6:
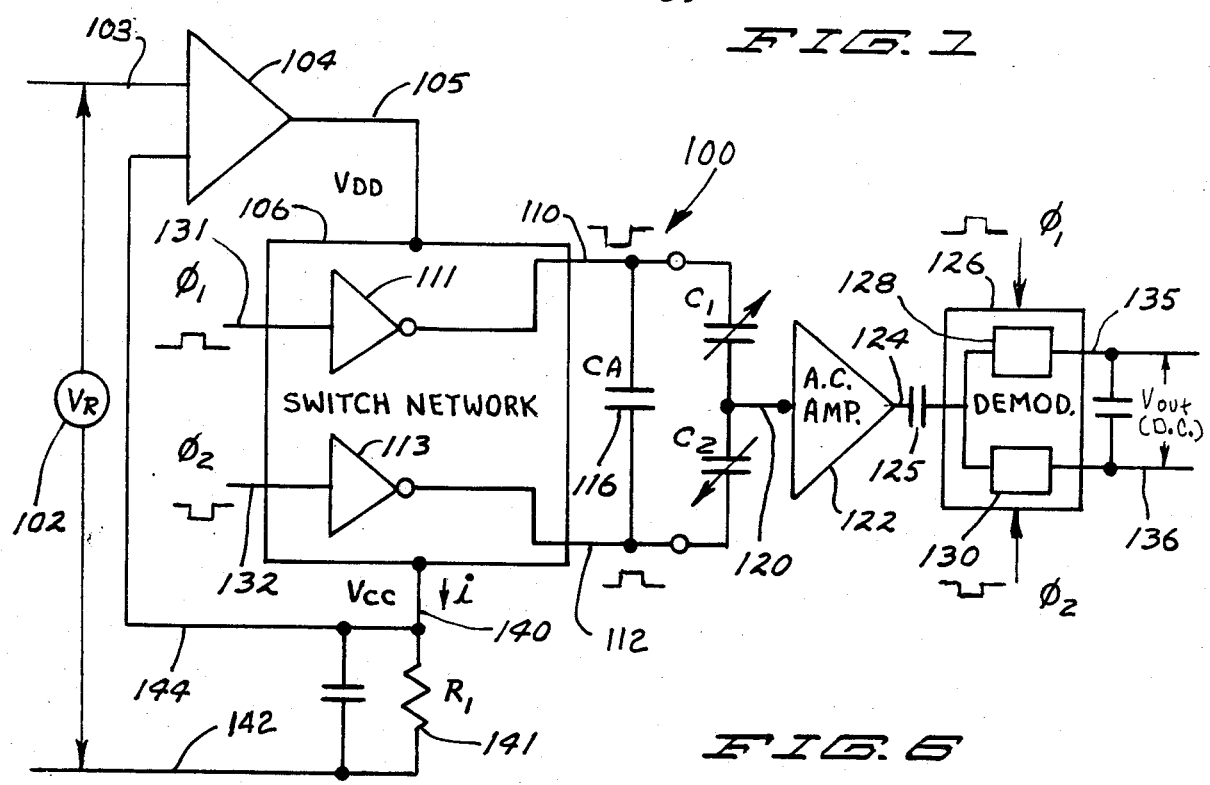
FIG. 6 is a simplified schematic representation of a circuitry suitable for sensing capacitance changes caused by deflection of the sensor plates under differential pressure.

The capacitive outputs may be sensed in a conventional manner, as desired, or a circuit such as that in FIG. 6 may be used. Reference is made to copending application Ser. No. 660,396, filed on Oct. 12, 1984, entitled Circuit For Capacitive Sensor Made Of Brittle Materials for examples of useful circuits for sensing.

When a fluid pressure is present in the chamber 21, the pressure will act on the outer surfaces of the plates 42 and 43. Assuming that the pressure is positive it will tend to force the plates 42 and 43 together. Pressure in chamber 26 also acts on the outer surfaces of the plates 48 and 49, and there will be a resistance to the spreading apart of the plate 48 and 49. The substantially incompressible fluid that is filling the chambers 45 and 52, as well as the conduit chamber 53, results in any deflection of the plates 42 and 43 relative to each other due to pressure on them to be resisted by the plates 48 and 49, and deflection of the plates will be a result of a differential in the pressures in the chamber 21 and the chamber 26. Measuring the spacing changes capacitively thus provides a signal indicating the pressure differential in the two chambers.

Batch fabrication of the individual brittle plates 42, 43, 48, 49, forming electrode members can be carried out quite easily. Silicon, quartz or other brittle material is made up in a wafer such as a three inch wafer, and then very small diameter holes (5 to 15 mil) can be laser drilled at regularly spaced intervals. The thickness of the wafers will be in the order of 5 to 10 mils. After drilling, a thin film deposition can be made on both sides of the wafer, and through the preformed holes in a desired pattern. In other words, the thin film will be an layer on each side of the wafer, encircling each of the holes to a desired size to form the necessary connection means and capacitive plate electrodes as illustrated by the conductive films in FIG. 1.

Then, the desired glass film used for sealing can be applied in the desired pattern for each plate which will be cut from the wafer. This can be applied by screen printing or evaporation or sputtering with masks to generate the desired patterns of the glass material on the sides of the wafer for attachment of sealing caps, pedestals and for the annular seal made at the periphery of each plate.

After this, the individual plates can be quickly cut out, so that the batch of individual plates is made from a large wafer. Then the assembly can continue in a desired manner to fuse the outer edges of the pairs of plates together, and to fuse on the seal caps and conduits to the center portions of the plate.

FIGS. 2, 3, 4 and 5 show the sensor element in various stages of manufacture and use. FIG. 2 schematically shows an initial assembly of the sensor element, showing the plates in a substantially unstressed (flat) condition. There is no filling of oil in the chamber formed, and thus the plates are not subjected to bending stress when they are in contact with each other as shown in FIG. 2. It is in this position where the outer edge portions of the plates are fused together. The pedestal or conduit 47 can be used for supporting the two sensor portions as shown from a temporary support 80.

In analyzing the equations that are effective in describing the operation of the sensor assembly, the first sensor element portion 41 will be designated with a subscript "1" and the second sensor element portion 46 will be designated with a subscript "2". The pressure inside the sensor element portion 41 will be designated $p_1$ (see FIG. 1), and any spacing shift between the two surfaces forming the sensing plates in the form shown will be designated $X_1$. The pressure in the chamber of the second sensor portion it will be $p_2$, and the spacing of the plates of the second sensor element portion 46 will be $X_2$. Likewise, capacitance indications will be $C_1$ and $C_2$, respectively, for the two sensor element portions.

In considering the operation of the sensor, and its analysis, the pressure in chamber 21 which houses the first sensor element portion will be considered to be $p_3$ (FIG. 1) and the pressure in the housing 26 acting on the second sensor element portion 46 will be $p_4$. Normally, the measured quantity will be $\Delta p = p_3 - p_4$. As was stated, when the plates or diaphragms are assembled so that they are in contact on both sensor element portions at zero pressure on the interior, that is, $p_1$ equals zero equals $p_2$ equals zero, then $X_1$ and $X_2$ also equal zero. When they are filled with fluid, each will have a spacing X and the stiffness of the sensor element portions, each comprising the assembly of two plates or diaphragms, will be a constant that will describe the deflection of the plates under external pressures. These constants are $K_1$ for the first sensor element portion and $K_2$ for the second sensor element portion.

The deflection of only one plate of each assembled pair relative to the other will provide a useful signal, as will be shown in discussion of FIG. 7.

After an oil fill the sensor element will assume the position as shown in FIG. 3 with $p_3 = p_4$. The spacing of the facing surface of the plates of each sensor portion represented at $X_1$ and $X_2$ is substantially equal and equals $X_o$. The plates only are subjected to modest bending stresses. The filling of the substantially incompressible fluid will expand or contract slightly on temperature changes, but this will not overstress the plates. It should be noted that the spacing and curvature of the plates has been grossly exaggerated in the present drawings. The full scale spacing of the plates is extremely small.

FIG. 4 schematically shows a condition of normal full scale differential pressure, where the deflection $X_1$ for the first chamber 45 is less than the deflection $X_2$, meaning that the pressure on the sensor portion 41 is greater than on the sensor portion 46. The deflection of the plates 48 and 49 results in moderate bending stresses at full scale operation. Preferably $$X_1 = \frac{X_o}{2} \text{ and } X_2 = \frac{3}{2} X_o.$$

$\Delta p$ = full scale pressure.

FIG. 5 schematically shows an extreme overpressure condition wherein the plates 42 and 43 are in contact across substantially their entire surfaces ($X_1 = 0$), and all of the incompressible fluid is forced into the interior passageway of the conduit and into chamber 52. Because the volume of the fill fluid or oil is controlled, the plates 48 and 49 are not excessively stressed in bending $X_2 = 2X_o$), and the overpressure condition on the plates 42 and 43 results in substantially pure compression of those plates. The pressure tends to compress the facing surfaces of the plates together, and because the brittle material can withstand a substantial mount of compressive stress, there is no danger of damaging the sensor element, or the plates forming the sensor element.

Thus, the ability to withstand exceedingly high overpressure is present, and the use of a brittle material for the plates keeps the size small, costs down, and lends itself well to batch processing of the thin film coatings for the electrodes of the capacitive sensing means as well as permitting accuracy.

The sensing element design is suitable for brittle materials which incorporates integral bidirectional overload protection for pressures up to several thousand psi which are encountered in industrial flow measuring applications. When the chambers are filled with oil and $\Delta p = 0$ the sensor element portion experiences modest bending stresses (tension and compression) which do not exceed the tensile strength of the materials used. Normal pressure excursions do not exceed 1.5 times this initial stress. Overload conditions in either direction bring one of the diaphragms or plate assemblies back to the initial condition where bending stresses are zero and further pressure results in pure compression (which brittle materials are known to withstand). The other diaphragm assembly experiences maximum bending stresses which are limited to two times the initial stress.

It should again be noted that in the drawings the plate spacing and bending conditions are greatly exaggerated, and the amount of spacing between the plates in operation is extremely small. However, changes in the spacing can be sensed accurately, due to the capacitive sensing features.

Chamber 72 formed the outer housing has a reference pressure in it and is affected by the levels of pressure $p_3$ and $p_4$ (see FIG. 1) which cause deflection of the facing surfaces of the housing. The spacing of electrodes 70 and 71 is thus a function of the static pressure level, which is:

$$\frac{p_3 + p_4}{2}$$

The electrodes 70 and 71 will provide a capacitance signal $C_3$ that will permit compensating the signals $C_1$ and $C_2$, which indicate differential pressure, for differences in static or line pressures at the same differential in pressure. The deflection of the surfaces carrying electrodes 70 and 71 could be measured optically or with strain gages, if desired. The changes of spacing of the plates or diaphragms under differential pressures can be determined with strain gages or with optical sensors as well as with capacitance sensing. However, capacitance sensing is desirable because of the extremely small deflections or movements involved.

In a complete analysis of the requirements for sensing the spacing between the diaphragms or plates in each of the sensor portions, where there are two chambers formed, and each of the chambers comprises a pair of brittle diaphragms sealed at their edges and having an oil fill, as shown, there are a number of factors that have to be taken into account, including the temperature, which affects the oil volume and hence its density, the modulus of elasticity of the diaphgram material, the diaphragm thickness, and the diaphragm diameter.

In order to determine the necessary equations for sensing the spacing differences, particularly in capacitive sensing, an analysis of the action under differential pressures is necessary. Assuming that a sensing cell is made as shown in FIG. 1, each of which comprises two diaphragms defining individual chambers (chambers 1 and 2) with the chambers of the individual diaphragm assemblies connected together by a conduit and filled with oil, the spacing between the diaphragm plates of each sensor portion is designated as X ($X_1$ is the first portion and $X_2$ is the second); the pressure acting on the exterior of the first sensor portion is designated as $p_3$, and the pressure acting on the exterior of the second sensor portion is designated as $p_4$. The internal oil pressures are designated as "p" that is $p_1$ for the first chamber and $p_2$ in the second chamber, which both are equal in normal operation ($p_1=p_2=p$), and the stiffness factors of the respective sensor portions are designated as $K_1$ and $K_2$, respectively.

The stiffness factors are constant terms that can be determined by the construction of the plates or diaphragms, including the tensile strength, modulus of elasticity, diameter and thickness of the diaphragms. Desirably $K_1$ will equal $K_2$, if the sensor portions are identical, but that is difficult to insure without precise control, and thus it is expensive to insure identical diaphragm or plate properties during manufacture.

Additionally, in the system shown when there is no oil filling that is, internal $p=0$, the plates are assumed to be substantially in contact, as previously explained, and the plate spacing (X) is substantially zero or in other words (@ $p=0$)$<<X_o$, where $X_o$ is the spacing after introduction of the oil fill. As stated as part of a mathematical analysis, referring to the representation of FIGS. 2 and 5, and with the quantities as defined above, including the stiffness factor of the plates, the following relationships are established:

$$X_1 = X_2 = 0 @ p = 0$$

With proper selection of the K terms for the pressure range desired, it is derived:

$$X_1 = K_1(p - p_3)$$

$$X_2 = K_2(p - p_4)$$

A first possible transfer function for relating $X_1$ and $X_2$ to differential pressure is:

$$Z_1 = X_1 - X_2 = K_1 p - K_2 p + K_2 p_4 - K_1 p_3 \quad (1)$$
$$Z_1 = p(K_1 - K_2) + K_2 p_4 - K_1 p_3$$
$$Z_1 = p(K_1 - K_2) @ p_4 = p_3 = 0$$

Note that this quantity depends on p, which will vary with temperature as the oil fill expands. This in not desirable and results in a large zero coefficient, unless $K_1 = K_2$. Making $K_1 = K_2$ precisely is very costly and usually impractical because of manufacturing tolerances.

In order to make that transfer function work, a temperature compensation circuit for zeroing is necessary. This can be done with a separate temperature sensor located at the pressure sensor housing and connected to a circuit to provide a signal that varied properly with temperature.

A second possible transfer function is:

$$Z_2 = \frac{X_1 - X_2}{X_1 + X_2} \quad (2)$$

or using capacitive sensing as previously described, $$Z_2 = -\frac{C_1 - C_2}{C_1 + C_2}$$

These last two quantities are equivalent if C is $a1/X$. By combining equations it is shown:

$$Z_2 = \frac{K_1 p - K_2 p}{K_1 p + K_2 p} = \frac{K_1 - K_2}{K_1 + K_2} @ p_3 = p_4 = 0 \quad (2a)$$

Note that this is independent of $pE\Delta p = 0$ so that this transfer function (2a) above exhibits excellent zero stability even if $K_1$ is not equal to $K_2$ and better performance is thus realized with lower manufacturing costs.

In analyzing equation (2), it is noted that the transfer function results in span errors since the output is proportional to the quantity $1(X_1 + X_2)$ and $X_1 + X_2$ is directly related to the expansion and contraction of the oil fill of the sensor sections at different temperatures.

Further analysis shows:

$$Z_2 = \frac{K_1(p - p_3) - K_2(p - p_4)}{K_1(p - p_3) + K_2(p - p_4)}$$

which equals $$\frac{p(K_1 - K_2) + K_2 p_4 - K_1 p_3}{p(K_1 + K_2) - K_2 p_4 - K_1 p_3}$$

which equals $$\frac{(p_4 - p_3) K_1}{p \times 2K_1 - K_1 p_4 - K_1 p_3}$$

if $K_1 = K_2$ which equals $$\frac{p_4 - p_3}{2p - (p_4 + p_3)}$$

For purposes of sensing differential pressures in the range normally desired, oil can be considered to be incompressible, and therefore:

$$p = p_0 + \frac{p_4 + p_3}{2}$$

when $P_o$ is the initial fill pressure the two chambers. The quantity $$\frac{p_4 + p_3}{2}$$

is the static line pressue on the differential pressure sensor.

Then, the following relationship can be established:

$$Z_2 = \frac{p_4 - p_3}{2p_0 + p_4 + p_3 - p_4 - p_3} = \frac{p_4 - p_3}{2p_0} = \frac{\Delta p}{2p_0}$$

This indicates that the output from a capacitive sensor mounted on the individual sensor portions is directly proportional to the quantity $1/p_0$ where $p_0$ is the pressure generated by the oil fill. the quantity $p_0$ varies at about six percent per 100° F. because of the expansion coefficient of oil used in sensors, which is usually a silicone oil. Thus, the transfer function $\Delta p/2p_0 = Z_2$ has no zero temperature coefficient at zero $\Delta p$, but it has a span temperature coefficient of six percent per 100° F. due to oil volume (and thus density) changes with temperature.

Temperature compensation circuitry for span error may be added by measuring the temperature and providing correction factors to the output, or, as shown in relation to FIG. 6 by providing a measure of oil density through use of sensing the series capacitance of the sensors used.

Sensor series capacitance is equal to:

$$C_s = \frac{C_1 \times C_2}{C_1 + C_2}$$

This capacitance ($C_s$) can be shown to be:

$$C_s \alpha \frac{e}{X_1 + X_2}$$

since $$C_1 = \frac{Ke}{X_1} \text{ and } C_2 = \frac{Ke}{X_2}$$

and $$\frac{C_1 \times C_2}{C_1 + C_2} = \frac{\frac{Ke}{X_1} \times \frac{Ke}{X_2}}{\frac{Ke}{X_1} + \frac{Ke}{X_2}} = \frac{Ke}{X_1 + X_2}$$

where e is the dielectric constant of the oil. The quantity $C_s$ can further be shown to be almost exclusively dependent on the density of the fill fluid. Since e is normally directly proportional to oil density and the quantity $X_1 + X_2$ is inversely proportional to density of the fixed amount of oil in the diaphragm assembles it can be seen that:

$$C_s \alpha \frac{e}{X_1 + X_2} \alpha \frac{\sigma}{\frac{1}{\sigma}} \alpha \sigma^2$$

where $\delta$ = oil density

Thus, $C_s$ can be measured with appropriate circuitry and used to compensate for errors caused by changes in oil density.

A typical simplified circuit incorporating this correction is shown in FIG. 6 at 100, and the pressure sensor capacitors of the previous form of the invention are represented by the capacitances $C_1$ and $C_2$. For example, the capacitance $C_1$ could be the capacitance plates 42B and 43B in FIG. 1 and capacitance $C_2$ could be the capacitance of the plates 48B and 49B in FIG. 1.

A voltage reference source represented by $V_R$ and shown at 102 is connected across one input line 103 of an excitation control operational amplifier indicated at 104, which provides a voltage along an output line 105 to a CMOS switch network 106. The CMOS switch network 106 is one third of a series 4069 CMOS network of standard design. The voltage on line 105 ($V_{DD}$) is the power supply voltage for the CMOS network, and the load on the output of the CMOS network 106 is from the capacitors $C_1$ and $C_2$ across a first output line 110 that is on the output of an inverter 111, and a second line 112 that is at the output of an inverter 113.

The capacitances $C_1$ and $C_2$, as shown, are in series between lines 110 and 112, and are connected in parallel with a capacitor indicated at 116 that is designated $C_A$. A common output lead 120 provides an output signal which is an AC signal connected to the input of a high impedance AC amplifier 122 having a selected gain to give an output voltage along the a line 124. The output voltage signal on line 124 is the amplified AC signal and is passed through a capacitor 125, to the input of a demodulator 126. The demodulator in this particular form is a series 4066 CMOS demodulator utilizing one-half of the 4066 chip, and the demodulator includes a first trigger gate 128 and a second trigger gate 130, each of which provides an output signal representing phase one and phase two of the square wave from the output line 124. The trigger gate output from gate 128 is connected to the input 131 leading to the inverter 111 of the switching circuit 106, and the trigger gate output from trigger gate 130 is connected to the input line 132 of the inverter 113 of the switching circuit 106.

A DC signal is provided on the output of the demodulator 126, across the output lines 135 and 136, respectively.

The integrated circuit CMOS switch network has a characteristic that its current consumption is directly proportional to the capacitance load across the lines 110 and 112. Thus, the current along a line 140 (labeled i) is proportional to $$C_A + \frac{C_1 + C_2}{C_1 + C_2} \text{ or } C_A + C_s$$

This current flows through a resistor 141, also indicated as $R_1$, to the line 142 across the voltage reference 102. The voltage drop across $R_1$ is sensed as a feedback voltage on a line 144 which is fed into the second input of the operational amplifier 104 that provides the power supply for the CMOS circuit. This in turn changes the voltage to the switch network 106 and the signal on line 120 changes proportionally. Thus, the current change at the output line 140 is reflected in the output voltage due to a change in the capacitance of the capacitors $C_1$ and $C_2$.

Mathematical analysis shows the following:

$$i = K (C_A + C_s) V_{pp} f$$
$$iR = V_R = K (C_A + C_s) V_{pp} f R_1$$

$$V_{out} + AV_{pp} \frac{C_1 - C_2}{C_1 + C_2} = \frac{AV_R}{KfR_1(C_A + C_s)} \times \frac{C_1 - C_2}{C_1 + C_2}$$

$V_{pp}$ is the voltage across lines 110 and 112; f is the frequency of that voltage; A is a constant; and the other quantities are as shown on FIG. 6. The function $C_A + C_s$ is a function of oil density. If $C_A$ is selected to approximately equal to $C_s$, then the quantity $C_A + C_s$ will vary by about 6%/100° F. and compensate for oil density changes. This can be seen by noting that $C_s$ will change about 12%/100° F. since $C_s \alpha \delta^2$. Thus, if $C_A \cong C_s$, the quantity $C_A + C_s$ will change about 6%/100° F.

A third and preferred way of deriving the differential pressure signal is to select new constants designated $K'_1$ and $K'_2$ and set them equal to $1/K_1$ and $1/K_2$, respectively. Then the output from the sensors can be analyzed as follows:

$$Z_3 = K'_1 X_1 - K'_2 X_2 \quad (3)$$

Substituting the 1/K factors, and the values for $X_1$ and $X_2$ stated in the original analysis the equation is as follows:

$$Z_3 = \frac{X_1}{K_1} - \frac{X_2}{K_2} = \frac{K_1(p - p_3)}{K_1} -$$

$$\frac{K_2(p - p_4)}{K_2} = p - p + p_4 - p_3$$

$$Z_3 = p_4 - p_3 = \Delta p$$

The equation (3) above for differential pressure is totally independent of p, the fill pressure, and the match between $K_1$ and $K_2$.

Thus using this equation as a basic function, the circuit constants $K_1$ and $K_2$ are adjusted for $Z_3 = 0$ at $\Delta p = 0$. The output from the sensor will then exhibit no zero or span errors caused by oil expansion or contraction even if the diaphragm assemblies are mismatched within normal manufacturing tolerances. Thus, the zero temperature coefficient and the span temperature coefficient effect on the circuit output will be zero due to fill oil expansion.

In FIGS. 7, 8 and 9, a preferred embodiment of the sensor cell construction is illustrated, along with strain gage sensors for determining diaphragm deflection in accordance with equation (3) above. The individual pressure sensing cells of the previous form of the invention are modified so that each differential pressure sensing cell 160 is formed with a rigid Pyrex or glass base or substrate 161, and an integrally formed diaphragm assembly 162 which is sealed (bonded) and fused to the upper surface of the rigid base 161 at the region indicated at 163 surrounding the base, to define an enclosed central area. The diaphragm assembly 162 in this form of the invention is made of silicon, a material dissimilar from the Pyrex or glass base 161, and the diaphragm assembly has an outer rim 164, and a substantially reduced thickness central diaphragm member 165 which will deflect under pressure. Either the diaphragm assembly 162 or glass base 161 may have a shallow recess formed directly under the central diaphragm, for example, if capacitance sensing was to be used in order to permit the formation of a capacitor plate which faces the diaphragm on the glass base 161. The provision of a shallow recess also aids in providing a good peripheral seal using an anodic bond.

A resistance strain gage bridge is formed on the upper surface 167 of the diaphragm to measure diaphragm movement.

The base 161 of each cell has a central passageway 168 defined therethrough, and at the end of the central passageway 168 of a first pressure sensing cell (the upper one shown in FIG. 9), a connecting tube 170 may be fixed to the base 161 in a suitable manner such as with a glass frit 171 that is fused to the lower side of the base, so that the central passageway 172 of the tube 170 aligns with the passageway 168. The opposite end of the tube 170 is fused to a second pressure sensing cell 160 that is formed in the same manner as the first pressure sensing cell 160 including the base 161. The second pressure sensing cell has a diaphragm assembly 162 fixed to an opposite surface of the base 161 from the tube 171. The central diaphragm member 165 overlies the passageway 168 and it will also bow or deflect under pressures to be sensed.

The two pressure sensing cells 160, and the connector tube 170 form a differential pressure sensing cell assembly 175, which is mounted in a suitable housing indicated generally at 176. The housing 176 as shown comprises a central dividing plate or support plate 177 that forms a dividing plate between two housing sections 178 and 179, respectively, each of which has a peripheral wall suitably attached to the plate 177 adjacent the outer edges of the plate as, for example, by fusing the housing section walls to the plate 177. The walls of the housing sections 178 and 179 form chambers indicated at 180 and 181, respectively, that surround and enclose the respective pressure sensing cells 160. The chambers 180 and 181 have pressure inlet openings for providing fluid under pressure to each chamber. The outer surface of the support tube 170 is sealed with respect to the support plate 177, where the support tube 170 passes through an opening in the plate 177, so that the chambers 180 and 181 are sealed from each other as well so that they isolate fluid pressures in the respective chambers.

A suitable filling of substantially noncompressible fluid, preferably silicone oil is introduced into the passageways 168 and 172, and is raised to an initial fill pressure (p) sufficient to slightly bow the brittle diaphragm members 165 to form interior chambers under the diaphragm members 165, as shown at 183 and 184, respectively.

Differentials in pressure in the chambers 180 and 181 will cause inward deflection of one of the diaphragm members 165 and an opposite, outward deflection of the other diaphragm member 165 once the oil has been filled under the diaphragm assemblies to form the chambers 183 and 184. The showing in FIG. 7 is exaggerated to show such a bow in the diaphragms, but because the diaphragms are made of brittle material such as silicon, the amount of bowing is very small.

The recesses that may be provided under the diaphragm members on the rigid base 161 are very shallow, and even with capacitive sensing there can be a slight gap between the diaphragm and the surface of the recess, or if there is no recess, the diaphragm and the surface of the base 161 may be slightly spaced and still function sufficiently accurately as described in the previous equations. However, when assembled, the diaphragm member and base 161 will be substantially in contact.

In this form of the invention, as shown typically in FIG. 8, which is a schematic representation of a portion of the outer surface 167 of one diaphragm, a resistance bridge 190 is formed on the surface of the silicon (or other semi-conductor) diaphragm in a known manner between the central axis of the diaphragm and its outer edges. It should be noted that the diaphragms shown in FIG. 7 are not necessarily circular in form, but generally would be rectangular to make it easier to manufacture in a batch process. Because there is a rigid base only the diaphragm members 165 deflect, that is, in each sensor cell one of the plates moves relative to the other. This construction also will work with capacitive sensing where only one of the plates forming the sensing cells will deflect relative to the other. As shown in FIG. 8, the resistance bridge 190A includes four resistors 191, 192, 193 and 194 positioned on the diaphragm so that two of the resistors will be under compression upon outward bowing of the diaphragm and two of the resistors will be in tension, to enhance the output from the bridge.

Suitable leads 195 and 196 are provided for exciting the bridge with an input voltage ($V_E$) and leads 197 and 198 are provided for obtaining the bridge output voltage.

An identical bridge is formed on each of the diaphragm members 165, and the leads can be carried out through suitable sealed apertures in the respective housing sections 178 and 179, as shown in FIG. 7. Only one lead is illustrated, but individual wires for exciting the bridge and sensing the bridge voltage are provided.

FIG. 9 is a simplified schematic of the bridges for both diaphragms of the sensing cell shown in FIG. 7, and for analysis, the resistance bridges are indicated at 190A and 190B, respectively and the excitation voltages are labeled $+V_E$ and $-V_E$, with the bridge output voltages indicated as $V_{b1}$ and $V_{b2}$.

The bridge output voltages are connected to bridge operational amplifiers indicated at 200 and 201, respectively. The "K" factor scaling from equation (3) is providing by the amplifier feedback resistors indicated at 202 and 203, on the respective amplifiers. These resistors are, for the purposes of the following equations, designated $R_1$ and $R_2$, respectively. Only $R_1$ needs to be adjustable, to adjust for a different K factor, of one pressure cell relative to the other, and the resistance $R_1$ and $R_2$ should be substantially equal in that the cells are substantially identical, within manufacturing variations.

The respective bridge output voltage is fed into the inputs of the differential amplifiers 200 and 201, and one terminal of each of the amplifiers is connected through a resistor 204 and 205, respectively, of equal value (designated $R_o$ in the following equations) to circuit common.

On the outputs of each of the amplifiers 200 and 201 there is an identical resistor 206, and 207, respectively which for the purposes of the analysis of the circuit will be designated $R_3$, and these resistors 206 and 207 are connected at their opposite ends from the amplifiers 200 and 201 to the respective inputs of a third amplifier 210. One terminal of the amplifier 210 is connected through a resistor 211 to circuit common, and a feedback resistor 212 is connected between the output of the amplifier 210 and the other input terminal. Resistors 211 and 212 are equal in value to 206 and 207, and also will be designated $R_3$ in the equations.

The resistors of the respective bridges 190A and 190B are equal in value, and the excitation voltages are also equal. When the sensing cells have been constructed and the bridges on the respective diaphragms are excited, the resistances of the bridges are adjusted so that the output voltage $V_b$ of each bridge is equal to zero when the diaphragms are not filled with oil and the spacing of the respective diaphragms is equal to zero (or at the slight spacing as previously described). That is, $V_b = 0 @ X_1 = X_2 = 0$.

$X_1$ and $X_2$ are the spacings of the respective diaphragms 165 and base of the respective sensor cells. At this condition, $V_{b1}$ is proportional to $X_1$ and $V_{b2}$ is proportional to $X_2$, where the bridge voltages of the respective bridges equal $V_{b1}$ and $V_{b2}$.

In accordance with the previous analysis of equation (3) the following relationships are thus established:

$$V_{b1} = K_1 X_1 V_E \text{ and } V_{b2} = K_2 X_1 V_E$$

As previously stated, the resistors 202 and 203 provide the K factors, so resistor 202, which is adjustable, is set so that $Z_4$, the output voltage, is zero when the differential pressure is zero, after the diaphragm chambers and passageways 168 and 172 have been filled with oil. This is expressed as follows:

$$Z_4 = 0 @ p_3 = p_4$$

Again, the resistors in FIG. 9 are selected so that resistors 202, 203, 204, and 205 are substantially equal. That is:

$$R_0 = R_2 = R_1$$

Also as stated, the resistors 206, 207, 211 and 212 are equal in value and all equal $R_3$.

With this relationship, and the bridge resistance of the respective bridge 190A and 190B being set equal to $R_{b1}$ and $R_{b2}$, the following relationship is established:

$$Z_4 = V_{b1} \frac{R_1}{R_{b1}} \times 2 - V_{b2} \frac{R_2}{R_{b1}} \times 2$$

This then corresponds to the desired output exemplified in equation (3) when the K'1 equals $R_1$ and K'2 equals $R_2$.

This simplified schematic shows that the device of the present invention operates with one plate deflecting (which in the form shown in FIG. 7 is preferred because of its greater ease of manufacture) and will work with strain gage sensing as well as capacitance sensing.

Although the present invention has been described with reference to preferred embodiments, workers skilled in the art will recognize that changes may be made in form and detail without departing from the spirit and scope of the invention.

What is claimed is:

1. A pressure sensing cell construction comprising a plate assembly of a pair of plates formed together to form a first sealed chamber between said plates and the plates being positioned substantially contiguous to each other on facing surfaces with no filling in the first chamber;

an opening defined in at least one of said plates and open through the plate to the first chamber formed between the plates;

means forming a second fluid chamber fluidly communicating with the first chamber;

a filling of substantially incompressible fluid in said first chamber formed between said plates to separate the plates, and means associated with said second chamber to exert a pressure on said incompressible fluid filling in said first chamber to cause at least one of the plates to bow relative to the other a desired amount at a reference pressure in said first chamber;

means to subject the exterior surfaces of said plates to a pressure to be measured, said second chamber and the means associated with said second chamber providing a pressure on said incompressible fluid; and means associated with at least one of said plates to measure the relative deflection thereof.

2. The pressure sensing cell of claim 1, wherein the second chamber is filled with substantially incompressible fluid.

3. The apparatus as specified in claim 2 wherein said second chamber is formed by two second plates of substantially similar construction to the first mentioned two plates, said two second plates being formed together to define the second chamber, and conduit connecting said first and second chambers.

4. The apparatus of claim 3 wherein the conduit is a rigid tube and means coupling one of the plates forming each of the first and second chambers to the conduit for physically supporting such plates on the conduit.

5. The pressure sensing cell of claim 1 wherein the second chamber provides a substantially constant pressure on the incompressible fluid in the first chamber at rest.

6. The apparatus as specified in claim 1 wherein said means to measure deflecting movement comprises electrode means on the facing surfaces of said plates for forming a variable capacitor having capacitance values dependent upon the relative spacing of said plates.

7. The apparatus as specified in claim 1 wherein said means to measure deflection comprises strain gage means providing an output indicating deflection of said at least one plate.

8. The apparatus of claim 1 wherein said plates are formed from material selected from one material of the group consisting of silicon, quartz, glass, sapphire and a ceramic material.

9. The apparatus of claim 1 wherein the plates forming the first chamber are substantially identical in construction and are sealed together at their peripheries.

10. A differential pressure sensor assembly having first and second sensor portions;

said first and second sensor portions each comprising a pair of plates, at least one of which is a brittle material, initially substantially contiguous to each other along first surfaces of said plates and sealed together along an encompassing line with portions of said first surfaces being unconnected to permit movement of at least one of the plates comprising each sensor portion relative to the other plate of the same sensor portion to form first and second chambers, respectively, in each of the first and second sensor portions;

fluid conduit means for connecting said first and second chambers, respectively;

a quantity of substantially incompressible fluid filling said first and second chambers and said conduit means;

housing means to permit subjecting at least one of the plates of each sensor portion to pressure tending to move the plates forming each sensor portion together, the pressure acting on the respective sensor portion being at least at times different from the pressure acting on the other sensor portion, whereby the incompressible fluid will be forced into one chamber from the other chamber and cause increase in bending stress of the plates in one of said sensor portions and a decrease in bending stress of the plates of the other sensor portion; and said other sensor portion reaching a condition wherein the first and second surfaces of the plates forming the other chamber of the sensor assembly are substantially contiguous before either of the plates forming the one sensor portion reach an excessive stress level.

11. The apparatus as specified in claim 10 where the spacings between the plates of the sensor portions are sensed by sensing means providing an output signal substantially represented by $$Z = \frac{X_1 - X_2}{X_1 + X_2}$$

where $X_1$ and $X_2$ represent said spacings, respectively, and Z is an output signal representing said differential pressure.

12. The apparatus of claim 10 where the spacings between the plates of the respective sensor portions are sensed by means providing an output signal substantially represented by $Z = K_1 X_1 - K_2 X_2$ where $X_1$ and $X_2$ represent said spacings, respectively, Z is an output signal representing differential pressure and $K_1$ and $K_2$ are constants selected to make Z substantially equal to zero when differential pressure is substantially zero.

13. The apparatus as specified in claim 10 and capacitive electrode means on the facing surfaces of the respective plates of each of said sensor portions to permit determining differences in spacing of such facing surfaces of the respective sensor portions by capacitive measurement.

14. The apparatus of claim 13 and circuit means coupled to the capacitive electrode means of the respective sensor portions to provide a signal representing the series capacitance of capacitors formed by the capacitance electrodes of the sensor portions.

15. The apparatus of claim 13 and a third capacitor connected in parallel with the capacitors formed by the electrodes on the facing surfaces of the first and second sensor portions, which form first and second capacitors, respectively, and circuit means coupled to the first, second and third capacitors to provide an output voltage dependent upon the function $C_A+C_s$ where $C_A$ is the capacitance value of the third capacitor, $C_s$ represents the series capacitance of the first and second capacitors and $C_A$ is selected to be approximately equal to $C_s$.

16. The apparatus as specified in claim 10 wherein said plates forming the first and second sensor portions are each made of the same material and such material has limited tensile strength properties.

17. The apparatus of claim 16 wherein said plates are made of a material having a tensile strength between 1,000 psi and 50,000 psi.

18. The apparatus of claim 10 wherein said housing means comprises a housing having first and second housing chambers, respectively, containing the first and second sensor portions, respectively, and a separate chamber formed between the first and second housing chambers and formed by facing housing surfaces, compensation capacitive sensing electrodes formed on the facing housing surfaces for providing a capacitance signal indicative of the magnitude of the static line pressures in the first and second housing chambers sensed by the first and second sensor portions.

19. The apparatus of claim 10 wherein said housing means has housing surfaces which deflect as a function of static line pressure acting on the sensor portions, and means to measure deflection of such housing surfaces for providing a signal indicative of the magnitude of the static line pressures acting on the first and second sensor portions.

20. The apparatus of claim 10 wherein said fluid conduit means is a rigid conduit, and means to physically support the first and second sensor portions on opposite ends of the rigid conduit, the conduit having a central passageway open to both of the first and second chambers.

21. The apparatus of claim 20 and means for physically supporting the first conduit means on said housing means.

22. The apparatus of claim 10 and a resistive temperature sensing element mounted on the housing means to provide a signal to compensate for errors relating to temperature variations at the pressure sensor assembly.

23. A differential pressure sensor assembly having first and second sensor portions;
said first and second sensor portions each comprising a pair of plate means having facing first surfaces initially substantially contiguous to each other along said first surfaces and said plate means being sealed together around a periphery for forming chambers, the major portion of said first surfaces of each pair of plates being unconnected to permit relative deflection of the plates comprising each sensor portion to form first and second chambers, respectively, in the first and second sensor portions;
fluid conduit means for connecting said first and second chambers, respectively;
a quantity of substantially incompressible fluid filling said first and second chambers and said conduit means, said first and second chambers of each of said first and second sensor portions being substantially the same volume when the sensor portions are at equal external pressures, and the spacing of the pair of plates forming the respective sensor portions being substantially equal to the spacing of the plates of the other sensor portion at equal radial distances from the center of the respective sensor portion;
housing means for providing a separate pressure signal to each sensor portion thereby tending to move the plates of each sensor portion together, the pressure acting on the respective sensor portions being at least at times different from the pressure on the other sensor portion, whereby the incompressible fluid will be forced into one chamber from the other chamber and cause increase in bending stress of the plates in one of said sensor portions and a decrease in bending stress of the plates of the other sensor portion; and
said other sensor portion reaching a condition wherein the first and second surfaces of the plates forming the other chamber of the other sensor portion are substantially contiguous before the plates forming the chamber of the one sensor portion reach an excessive stress level.

24. The pressure sensor of claim 23 and means to measure deflection of at least one plate of one sensor portion relative to the other plate of that sensor portion.

25. The pressure sensor of claim 23 where the internal volume of the fluid conduit means is substantially less than the quantity of fluid enclosed by said first and second chambers.

* * * * *

UNITED STATES PATENT AND TRADEMARK OFFICE
CERTIFICATE OF CORRECTION

PATENT NO. : 4,603,371

DATED : July 29, 1986

INVENTOR(S) : Roger L. Frick

It is certified that error appears in the above-identified patent and that said Letters Patent is hereby corrected as shown below:

Col. 3, line 64, "assemsbly" should read --assembly--.

Col. 4, line 59, "chamberf" should read --chamber--.

Col. 5, line 16, "saphire" should read --sapphire--.

Col. 7, lines 6-7, "an layer" should read --an encircling layer--.

Col. 8, line 40, "mount" should read --amount--.

Col. 9, line 66, "(@p=0)" should read --X(@p=0)--.

Col. 10, line 43, "$\alpha 1/X$" should read --$\propto 1/X$--.

Col. 10, line 21, "This in not" should read --This is not--.

Col. 10, line 48, "pE$\Delta$p=0" should read --p@$\Delta$p=0--.

UNITED STATES PATENT AND TRADEMARK OFFICE
CERTIFICATE OF CORRECTION

PATENT NO. : 4,603,371

DATED : July 29, 1986

INVENTOR(S) : Roger L. Frick

It is certified that error appears in the above-identified patent and that said Letters Patent is hereby corrected as shown below:

Col. 10, line 49, "exhibitsexcellent" should read --exhibits excellent--.

Col. 11, line 36, "the quantity" should read --The quantity--.

Col. 11, line 60, the symbol "α" in the equation should read --$\alpha$--.

Col. 12, line 16, the symbol "α" in the equation should read --$\alpha$-- in all occurrences.

Col. 12, line 49, "the a line" should read --a line--.

Col. 13, line 33, "$C_s \alpha \delta^2$" should read --$C_s \alpha \sigma^2$--.

Col. 14, line 10, "inventio" should read --invention--.

Signed and Sealed this

Eleventh Day of November, 1986

Attest:

DONALD J. QUIGG

Attesting Officer    Commissioner of Patents and Trademarks